United States Patent
Leifer et al.

(10) Patent No.: US 6,280,327 B1
(45) Date of Patent: *Aug. 28, 2001

(54) WIRELESS GAME CONTROL UNITS

(75) Inventors: Alan E. Leifer, Dix Hills, NY (US); Chi-Fu Peng, Chung Li (TW)

(73) Assignee: Arista Interactive LLC, Hauppauge, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,489

(22) Filed: Jun. 5, 1998

(51) Int. Cl.[7] ..................................... A63F 13/06
(52) U.S. Cl. .................. 463/39; 463/36; 345/156
(58) Field of Search .................. 463/36, 37, 38, 463/39; 345/156, 161

(56) References Cited

U.S. PATENT DOCUMENTS

| | | |
|---|---|---|
| 4,531,740 | 7/1985 | Green et al. . |
| 4,870,389 | 9/1989 | Ishiwata et al. . |
| 4,924,216 | 5/1990 | Leung . |
| 5,098,110 | 3/1992 | Yang . |
| 5,451,053 | * 9/1995 | Garrido ............................ 273/148 B |
| 5,632,680 | 5/1997 | Chung . |
| 5,648,797 | 7/1997 | Lam . |
| 5,759,100 | * 6/1998 | Nakanishi ............................. 463/37 |
| 5,806,849 | * 9/1998 | Rutkowski ............................. 463/38 |
| 5,854,621 | * 12/1998 | Junod et al. ......................... 345/158 |
| 5,855,483 | 1/1999 | Collins et al. . |
| 5,874,944 | * 2/1999 | Khoury ............................... 345/161 |
| 5,881,366 | * 3/1999 | Bodenmann et al. ................. 455/66 |
| 5,897,437 | * 4/1999 | Nishiumi et al. ...................... 463/47 |
| 5,984,785 | * 11/1999 | Takeda et al. ......................... 463/38 |
| 6,019,680 | * 2/2000 | Cheng .................................. 463/37 |

* cited by examiner

Primary Examiner—J. Harrison
(74) Attorney, Agent, or Firm—Keusey & Tutunjian, P. C.

(57) ABSTRACT

A wireless control unit includes a controller having at least one user operable switch and wireless transmitter circuitry for transmitting game information, including a auto activate start information, and a console interface having wireless receiver circuitry for receiving the game information, including the auto activate start information, form the controller and for modifying the game information so that an activate signal is continuously sent from the console interface to the console and at least one object in a game being played with the video game system is continuously activated.

18 Claims, 8 Drawing Sheets

WIRELESS GAME CONTROL UNITS

CROSS REFERENCE TO RELATED APPLICATIONS

This application is a Continuation-in-Part of U.S. patent application Ser. No. 09/023,813 filed Feb. 13, 1998, abandoned.

FIELD OF THE INVENTION

The present application generally relates to electronic device controllers. More particularly, the present application relates to wireless electronic device control units that include an auto activate function.

BACKGROUND

Home video game systems generally have a game console coupled to a television monitor and one or more game controllers connected to the console which permit user interaction with a game being played. Most video game systems are sold with game controllers that are connected to the console through a hard-wire link. More recently, wireless game controller accessories have been developed which provide players with more freedom of movement. Such wireless controller accessories replicate the basic control features found on conventional hard-wired controllers but use infrared or other electromagnetic radiation to send signals to the console.

To operate the video game system, a user (or player) inserts a game program which may be stored in a game cartridge or on a compact disc into the console and typically depresses a start switch to begin play of the particular game programmed into the cartridge or on the compact disc. As a game is played, a player or players control various visual aspects of the game using either the hard-wired or wireless controllers. For example, certain video games allow players to maneuver persons or aliens over various types of terrain, through tunnels, under water and over other various obstacles in order to score points. Some of these video games allow players to fly planes, helicopters, tanks and the like to attack various installations and score points. Other video games allow players to maneuver a person and to fire weapons at program generated images or at images of a person controlled by another player.

To allow players to continuously fire a weapon some conventional hard-wired video game systems include a auto fire function. In the hard-wired systems, the auto fire function can be activated by a single switch or the activation of a sequence of switches on the game controller. Activation of the auto fire function causes the game controller to continuously send to the game console a fire signal which results in the continuous firing of one or more game weapons.

Some current wireless game controllers include a power save (or sleep) function intended to conserve battery power when the controller is not in use for a predetermined period of time. The sleep function was mainly developed to conserve battery power when a controller's power switch is inadvertently left on after a player finishes playing a game. The sleep function automatically monitors the activity of the controller switches and turns off the power to the internal circuits of the controller after a predetermined period of time elapses without any switches on the controller being actuated.

However, since certain current wireless game controllers include the sleep function it is impractical to also include the auto fire function because if the auto fire function is activated and a user stops playing a game but fails to turn the controller power switch off, the auto fire function will continue to function so that the controller continues to generate and send the fire signal. The fire signal would then be detected by the sleep circuitry so that the sleep function does not activate and the controller would continue to draw battery power to generate and send the fire signals.

SUMMARY OF THE INVENTION

The present application provides various embodiments of wireless game control units that provides an auto activate function that is activated by a controller in the game control unit and maintained by a console interface in the game control unit.

In one embodiment, the wireless control unit includes a controller having at least one user operable switch and wireless transmitter circuitry for transmitting game information, including an auto fire (or activate) start signal, and a console interface having wireless receiver circuitry for receiving the game information, including the auto fire start signal, from the controller and for modifying the game information so that an activate signal is continuously sent from the console interface to the console and at least one object, such as a weapon, in a game being played with the video game system is continuously activated.

In an alternative embodiment, the wireless control unit can be configured for multiple player operation. The control unit includes a plurality of controllers each having at least one user operable switch and wireless transmitter circuitry for transmitting game information, including an auto activate start signal, and at least one console interface having wireless receiver circuitry for receiving the game information, including the auto activate start signal, from each of the plurality of controllers and for selectively modifying the game information from each controller so that when the auto activate start signal is received at least one fire signal is continuously sent from the console interface to the console and at least one object, such as a weapon, in a game being played with the video game system is continuously activated. The console interface can also include at least one connection port to receive at least one memory cartridge for storing game information associated with a game being played with each controller.

The present application also provides a video game system that includes a game console, a controller having at least one user operable switch and wireless transmitter circuitry for transmitting game information, including an auto activate start signal, and a console interface connectable to the game console and having wireless receiver circuitry for receiving the game information, including the auto activate start signal, from the controller and for modifying the game information so that an activate signal is continuously sent from the console interface to the console and at least one weapon in a game being played with the video game system is continuously activated. The video system may also include a connection port for receiving a memory cartridge that stores game information.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
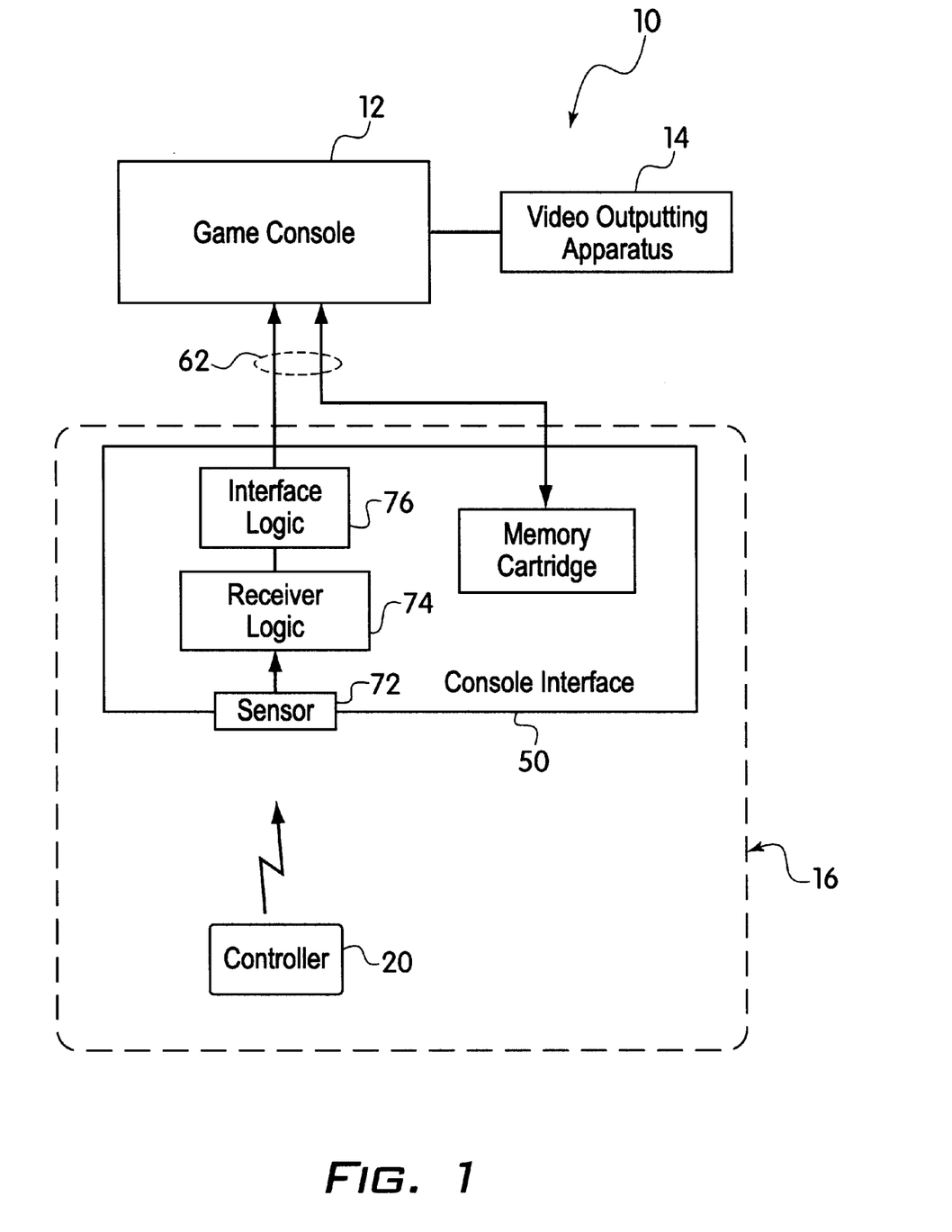
FIG. 1 is a block diagram of a video game system incorporating a wireless controller unit according to the present invention.

The present application provides a wireless control unit for video game systems that provides a auto fire function that does not interfere with the proper operation of a sleep function incorporated into the wireless control unit. Preferably, the wireless control unit transfers game information by infra-red transmissions. However, other electromagnetic radiation techniques, such as radio frequency transmissions, may be employed. Referring to FIG. 1, an exemplary embodiment of a video game system incorporating the wireless control unit of the present application is shown. In this embodiment, the video game system 10 includes a game console 12, a video outputting device 14, such as a television monitor, and the wireless control unit 16. The game console 12 includes a housing having at least one controller (or game) connection port and a game cartridge port. A game cartridge has a video game program stored therein. Alternatively, the console 12 may include a disc drive mechanism in which a disc, such as a compact disc, has stored thereon a video game program.

The game console 12 also includes known circuitry for executing the video game program stored in the cartridge or on disc. For example, the console may include a processor, memory and stored system programs for controlling the operation of the console, controller interface circuitry, and audio/video generating and outputting circuitry. An example of suitable game consoles are included in the Nintendo N64®, SEGA Genesis and Sony Playstation game systems. In the video game system 10 according to this embodiment of the present invention, the console 12 is connected to a video outputting apparatus 14 via a direct wire link. Further, the wireless control unit 16 can be connected to the console by, for example, a direct wire link or by mating connectors.

Figure 2:
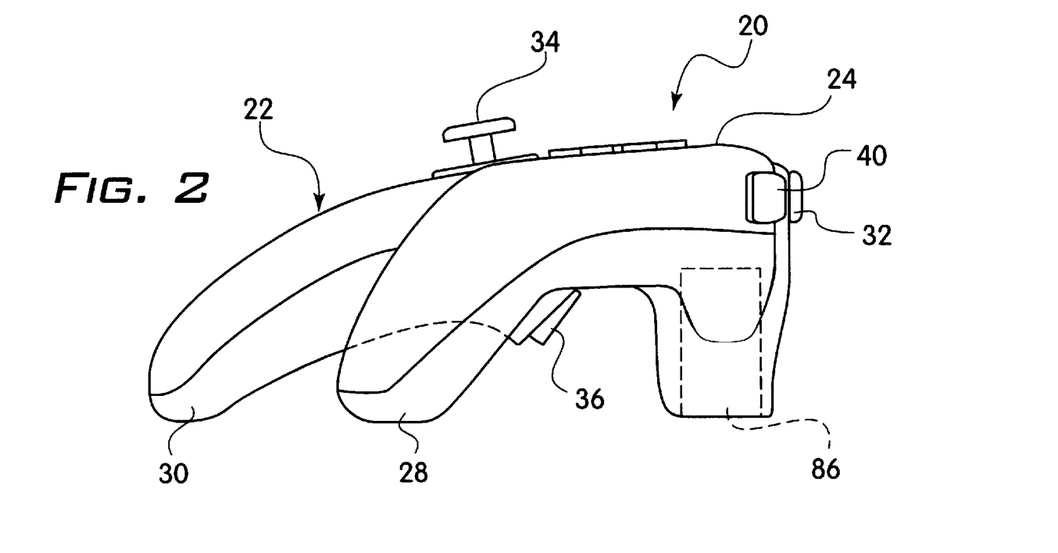
FIG. 2 is a side-elevational view of a controller for the wireless control unit 10 according to the present application.
Figure 3:
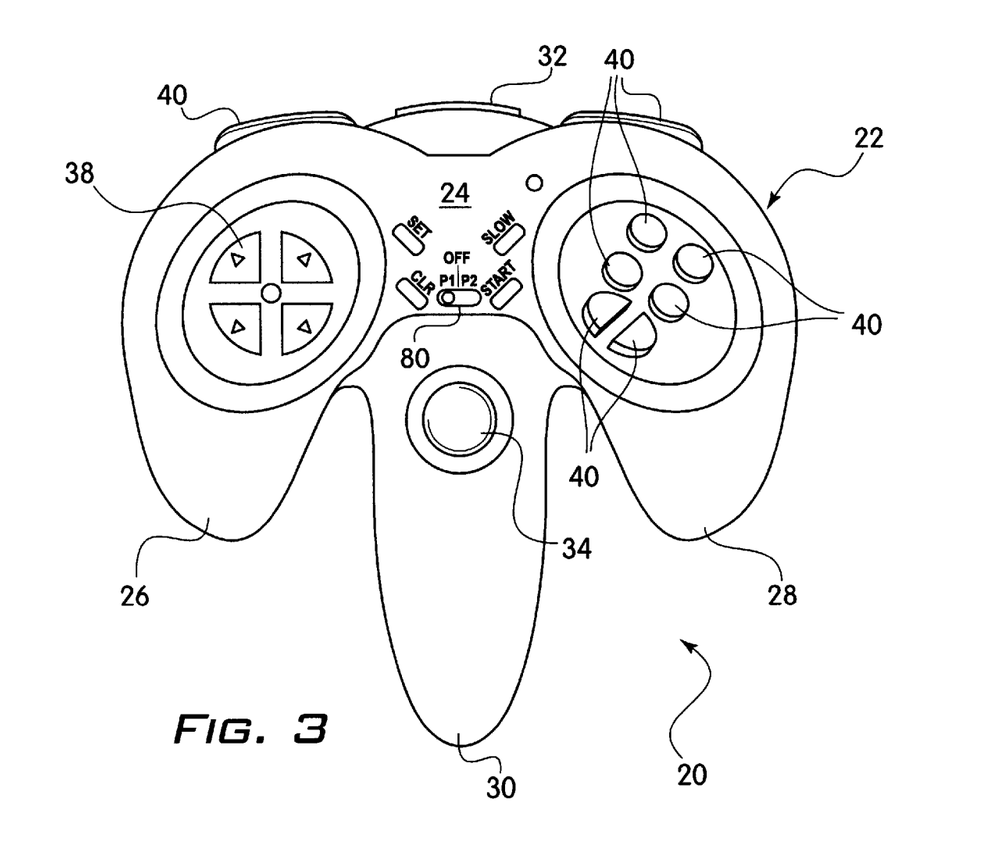
FIG. 3 is a top view of the controller of FIG. 2.
Figure 4:
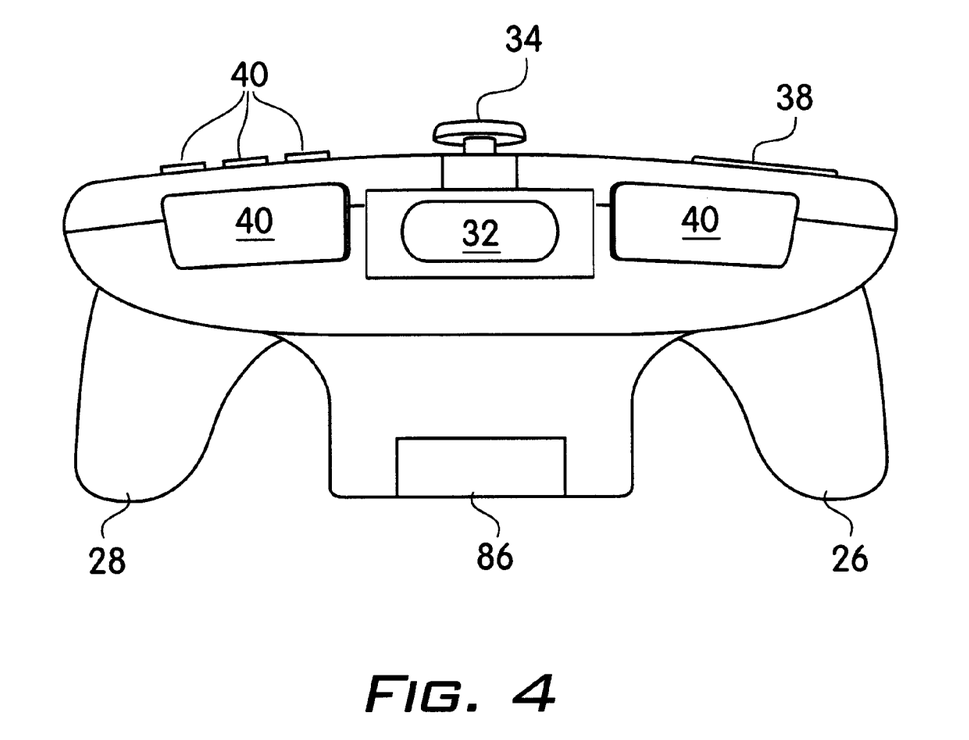
FIG. 4 is a front elevational view of the controller of FIG. 2.

Referring generally to FIGS. 1–4, the wireless control unit 16 according to one embodiment of the present application includes a controller 20 and a console interface 50. As seen in FIGS. 2–4, the controller 20 has a housing 22 defined by a control section 24, left and right side handles 26, 28 extending out from the control section 24 and then angled downwardly, and a center handle 30 extending from a center portion of the control section 24. Since in this embodiment signals are transmitted from the controller 20 to the console interface 50 via infrared, the housing 22 preferably includes a transmission window 32 for emitting infrared signals. However, if the transmission of control information from the controller 20 to the console interface 50 is by other electromagnetic radiation techniques then a transmission window may not be necessary. A plurality of user activated switches 40 are mounted to the housing 22 and accessible from outer surface portions of the housing 22. The controller 20 also includes a battery (not shown) that supplies power to the internal components of the controller.

Typically, a player grips the center handle 30 and one of the side handles 26, 28 during play and operates the switches corresponding to the handles gripped. A player may also grip the left and right side handles 26, 28, where rocker switch 38 and push-button switches 40 are the user activated switches. Rocker switch 38 can be used for two or three dimensional movement of an object controlled by the controller 20 and push-button switches 40 can be used for performing control functions associated with the object. Further, the orientation of the switches 40 and the three handle configuration of the controller 20 also facilitates single handed as well as two handed gripping and operation of the controller by a player. For single handed gripping and operation, a player can grip the center handle 30 and joystick 34 and trigger switch 36 are the user activated switches, Joystick 34 can be used for two or three dimensional movement of an object controlled by the controller 20, and trigger switch 36 can be used for performing at least one control function associated with the object. In this embodiment, trigger switch 36 is typically used to fire weapons during a game.

Figure 5:
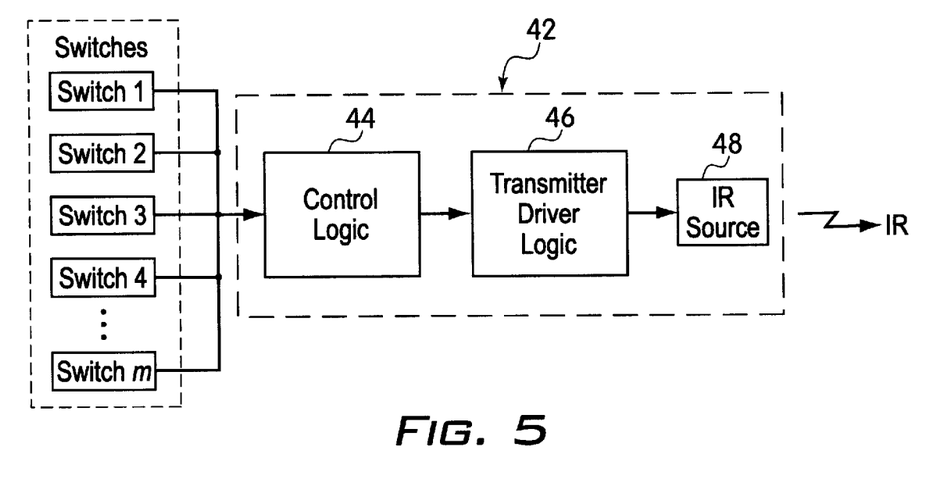
FIG. 5 is a block diagram of transmitter circuitry for the controller of FIG. 2.

Referring to FIG. 5, the controller 20 also includes transmitter circuitry 42 operatively connected to the various switches, which receives game information from the switches, formats the game information into, for example, bit streams for wireless transmission, and transmits the game information to the console interface 50. The transmitter circuitry 42 includes control logic 44, transmitter driver logic 46 and at least one transmitter source 48. The control logic 44 receives the game information from the various switches, and encodes the game information into, for example, a serial bit stream which is suitable for wireless transmission preferably by infrared. The bit stream may be configured such that one or more bits in the stream represents one switch on the controller 20. The transmitter circuitry 46 receives the bit stream from the control logic 44 and amplifies (if necessary) and modulates the bit stream at a predefined frequency band (e.g., 38 kHz) to energize at least one infrared source 48 (e.g., an LED) which emits infra-red signals.

To conserve battery power in the controller, the control logic 44 can be configured control battery power to the internal components of the controller and to monitor the activation of the switches and if none of the switches are activated for a predetermined period of time, e.g., about 2 minutes, the control logic shuts off the battery power to the internal circuits of the controller. This function is also known as a sleep function.

Figure 6:
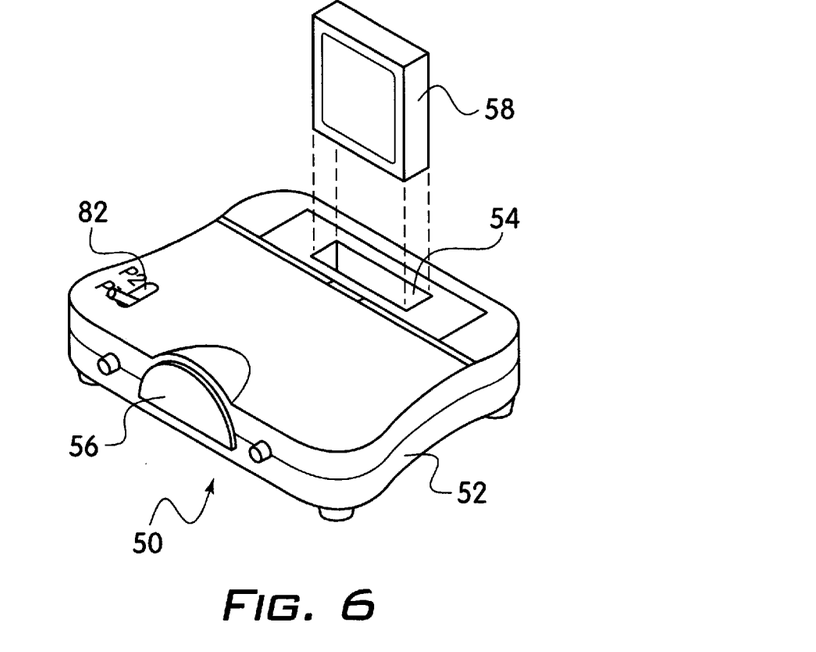
FIG. 6 is a perspective view of a console interface for the wireless control unit 15 according to the present invention.
Figure 7:
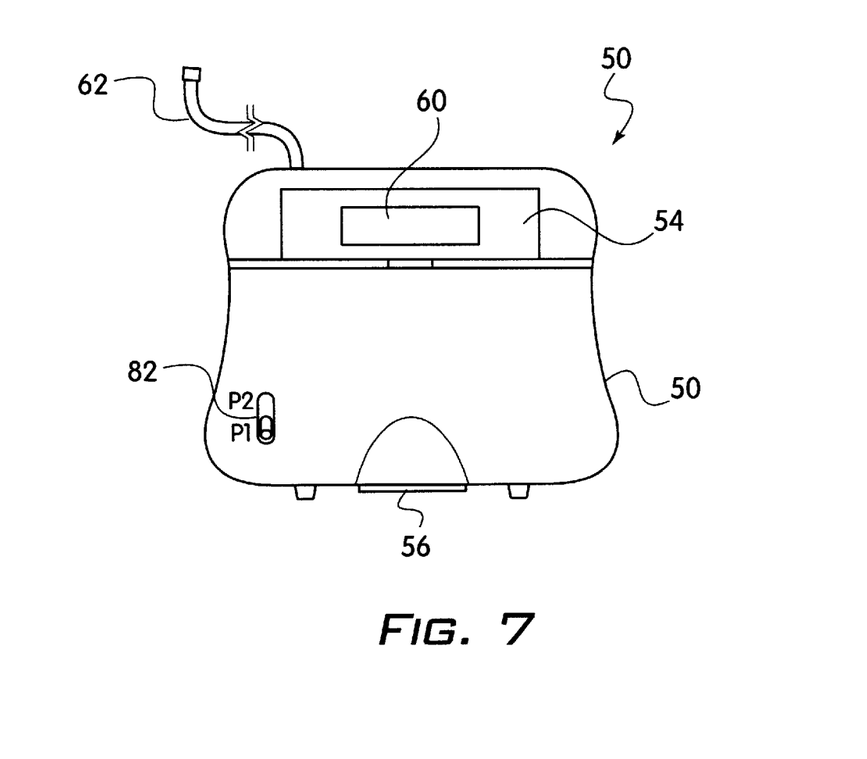
FIG. 7 is a top view of the console interface of FIG. 6.

Referring now to FIGS. 6 and 7, the console interface 50 has a housing 52 that includes a cartridge port 54 and, if necessary, a transmission window 56 for receiving the infra-red transmissions from the controller 20. The cartridge port 54 is configured to receive a memory cartridge (or memory card) 58 and includes a connector 60 that connects to a connector in the memory cartridge. An example of a suitable memory cartridge is the N64® CONTROLLER PAK™ manufactured by Nintendo. A cable 62 extending from the console interface 50 connects to the game console 12, preferably at the player controller connection ports on the game console. Alternatively, a connector compatible with the player controller connection ports on the console may extend from the console interface and plug directly into the game console.

Game information from the controller 20 and game condition information saved on the memory cartridge 58 are transferred to the game console 12 for subsequent processing via cable 62 or a connector extending from the console interface. In addition, when a player wants to end a game, the player can instruct the game console 12 to save the current game conditions in the memory cartridge 58 in the interface console.

Figure 8:
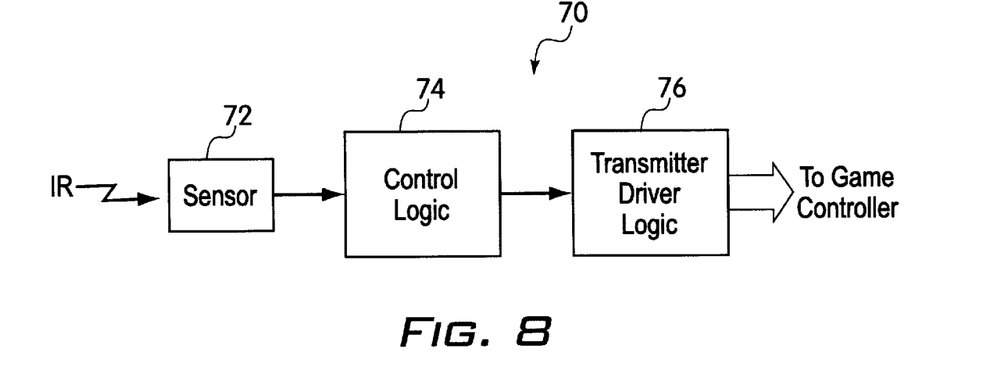
FIG. 8 is a block diagram of receiver circuitry for the console interface of the wireless controller unit.

Referring to FIG. 8, the console interface 50 also includes receiver circuitry 70 that receives the transmitted bit stream, extracts the game information from the bit stream, formats the game information into a form suitable for processing by the game console 12, and transfers the game information to the game console 12. More particularly, the receiver circuitry 70 includes a sensor 72, such as a photosensitive transistor, which receives the infrared signals from the controller 20, and receiver logic 74 that amplifies the received bit stream, demodulates the amplified bit stream and decodes the game information from the bit stream. Console interface logic 76 then formats the game information for transfer to the game console 12 via, for example, cable 62, seen in FIG. 7.

As noted, the auto fire or activate function in hard-wired systems is actuated and 20 generated at the controller so that the controller continuously sends an activate signal to the game console. In the wireless control unit according to the present application, the controller 20 sends the auto activate start signal which is included in the bit stream to the receiver circuitry 70 which decodes the game information from the bit stream. The console interface logic 76 also monitors the bit stream for the auto activate start signal, and when it is detected in the stream, the console interface automatically includes in the game information to be transmitted to the game console 12 an activate signal so that one or more objects, such as weapons, in the game being played and controlled by the controller is continuously activated. The console interface logic 76 continues to insert the activate signal into the game information sent to the game console 12 until the receiver circuitry 70 detects an auto activate stop signal from the controller. When the auto activate stop signal is detected by the receiver circuitry 70 the receiver circuitry stops inserting the activate signal into the game information sent to the game console 12.

By having the controller 20 send a signal to start the auto activate function and the receiver circuitry 70 in the console interface 50 to continuously provide the activate signals to the game console 12, the auto activate function does not prevent the activation of the sleep function in the controller. That is, the controller 20 of the wireless control unit according to the present application does not continuously send the activate signals when the auto activate function is active and the sleep circuitry in the controller does not continuously detect the auto activate start signal even after a player has stopped playing a game but has inadvertently left the controller power switch on.

The embodiment discussed above for the controller and console interface is for single player applications. For single player applications the controller 20 and the console interface 50 are pre-configured to transmit and receive the bit streams at one frequency band, e.g., 100 KHZ using one data coding scheme. However, many game programs executed by the game console permit multiple players to play at one time. For multiple player applications, a plurality of controllers 20 and either a single console interface 50 having receiver circuitry 70 to receive game information from the plurality of controllers (FIG. 9), or a plurality of console interfaces in one to one correspondence with the plurality of controllers (FIG. 10) are used. In either configuration, the game information transmitted from a controller 20 to its corresponding receiver circuitry 70 is differentiated from game information transmitted from other controllers 20 to their corresponding receiver circuitry 70 so as to avoid cross-talk between the controllers. To achieve this, the controller 20 and console interface 50 for each player may be configured to transmit and received the bit streams at the same frequency band but the frequency band for each controller and corresponding receiver circuitry is different. Alternatively, each controller may transmit the game information at the same frequency but the data coding scheme used by each controller and corresponding receiver circuitry is different. To select the operational frequency band or data coding scheme for the controller 20 and corresponding receiver circuitry 70 for each player, player select switches are provided. In an exemplary embodiment for two players in which the frequency band used is different for each player, the controller 20 includes player select switch 80, seen in FIG. 3, which allows a player to select a frequency band for player 1 (P1) or player 2 (P2) operation. Similarly, player select switch 82 on the console interface 50, seen in FIG. 7, allows the player to select a frequency band for player 1 (F1) or player 2 (P2) operation. In this embodiment, by selecting player 1 on the controller 20 and the console interface 50, the controller is set to transmit and the console interface to receive at one operational frequency band, for example, about 38 KHZ. By selecting player 2 the controller is set to transmit and the console interface to receive at another operational frequency band, for example, about 100 KHZ.

For multiple player applications, the transmitter driver logic 44 of the controller 20, seen in FIG. 5, is modified to be able to transmit the bit stream at different frequencies which can be selected by the player select switch 80. Similarly, the receiver logic 74 of the console interface 50, seen in FIG. 8, is modified to receive bit streams at different frequencies. Such receiver logic may include for example a band pass filter which sets the frequency band for receiving the bit stream before the stream is demodulated. More detailed descriptions of the transmitter and receiver circuitry can be found in U.S. Pat. Nos. 5,435,573 and 5,605,505, both of which are incorporated herein in their entirety by reference.

Figure 9:
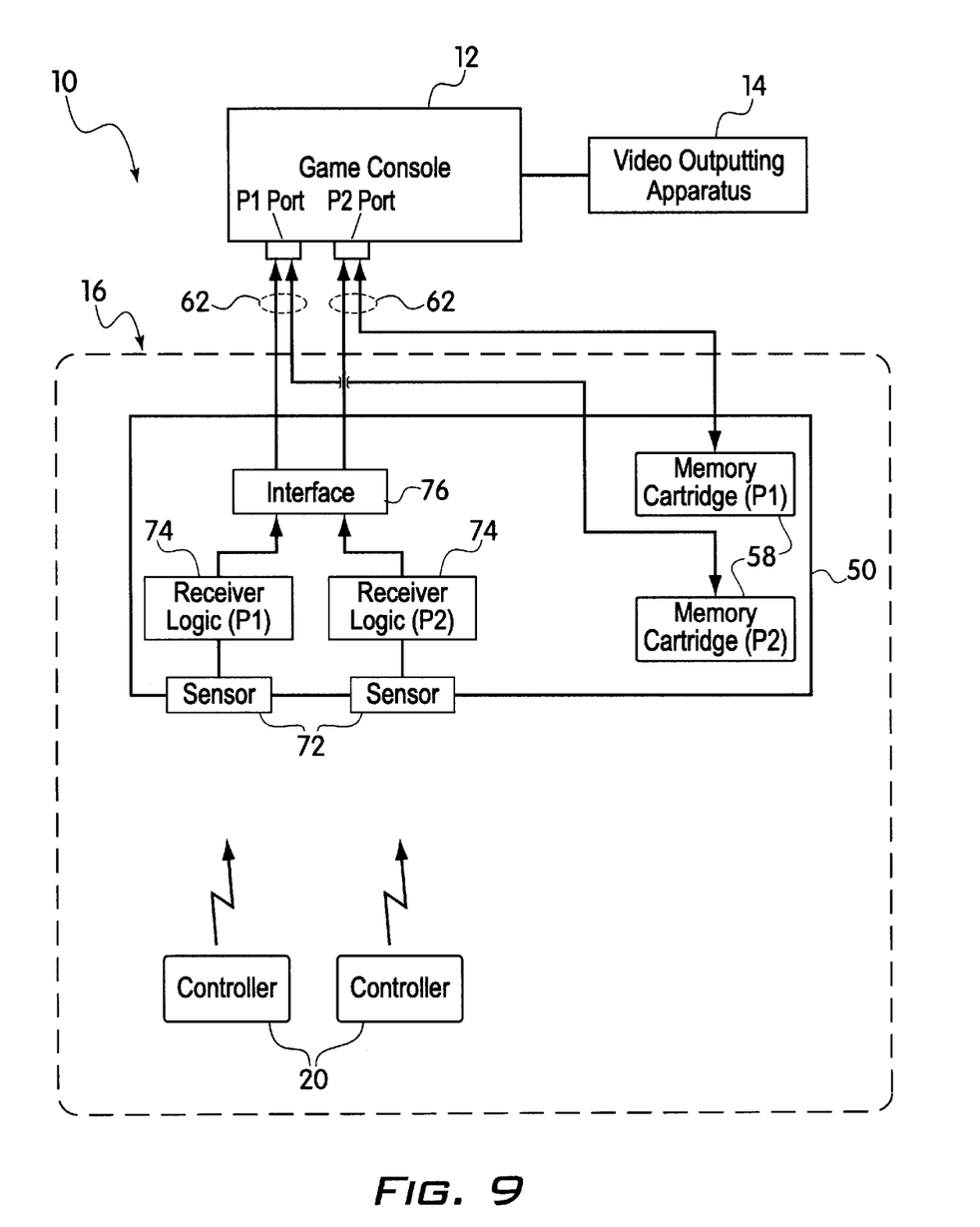
FIG. 9 is a block diagram of an alternative embodiment for the wireless control 20 unit according to the present invention, illustrating a console interface which supports multiple player use of the system.
Figure 10:
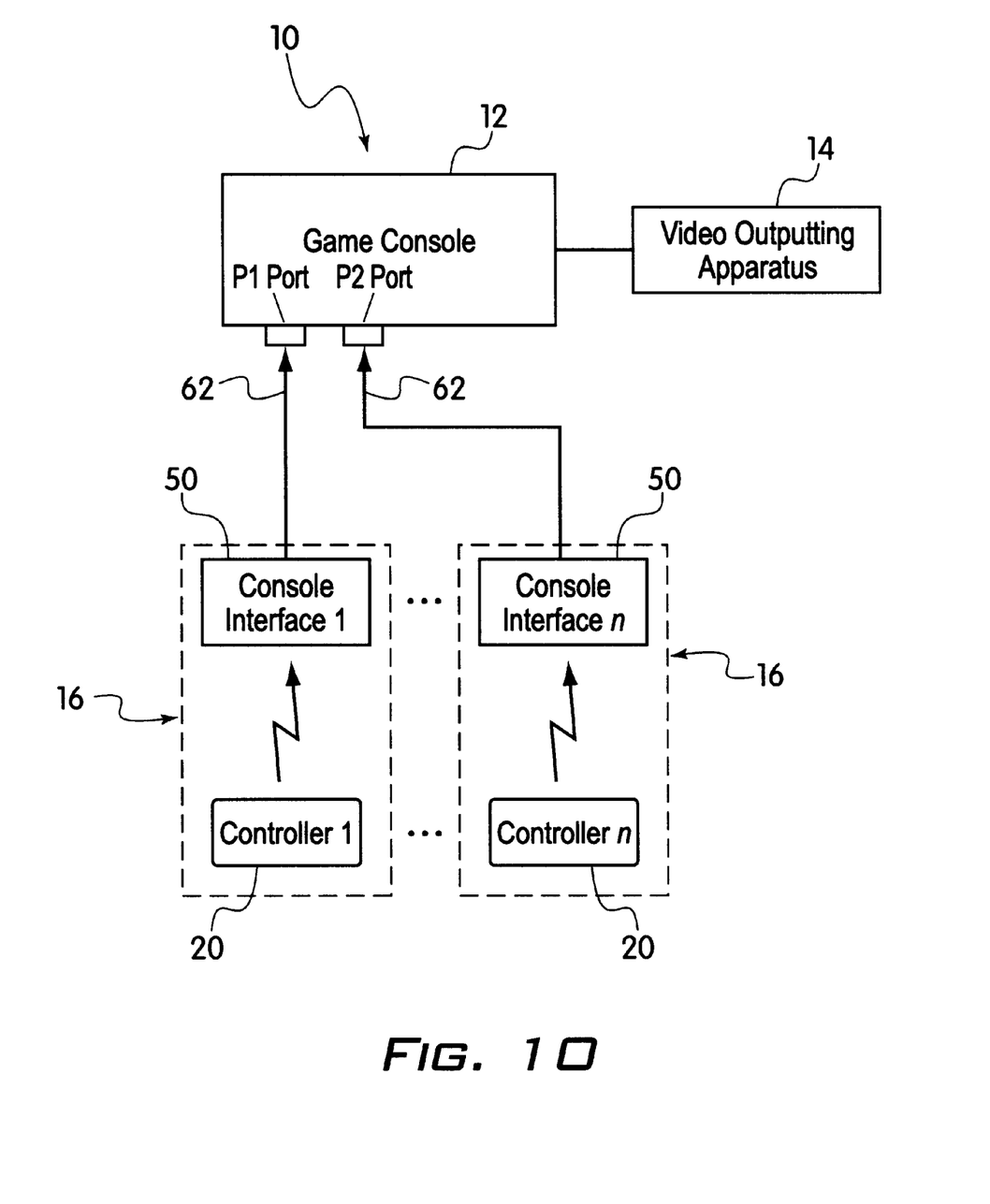
FIG. 10 is a block diagram of an alternative embodiment for the wireless control unit according to the present invention having separate console interfaces which support multiple player use of the system.

As noted, an alternative embodiment for the wireless control unit 16 is shown in FIG. 9. In this embodiment, the console interface 50 includes a plurality of sensors 72 and a plurality of corresponding receiver logic blocks 74 each block being reconfigured to receive bit streams at one frequency band. FIG. 9 shows two sensors 72 and two corresponding receiver logic blocks 74 which are used to separately receive game information from two controllers 20 for two player operation. However, the present application contemplates using more than two controllers so that more than two sensors and corresponding receiver logic blocks may used for more than two players.

In this embodiment, in order to allow each player to save his own game information, multiple memory cartridges 58 may be used, one for each player. However, a single memory cartridge may also be used to store game information for every player. Data transfers between each memory card and the game console would be by separate cables 62 (or connectors) connected to the player port on the game console.

Figure 11:
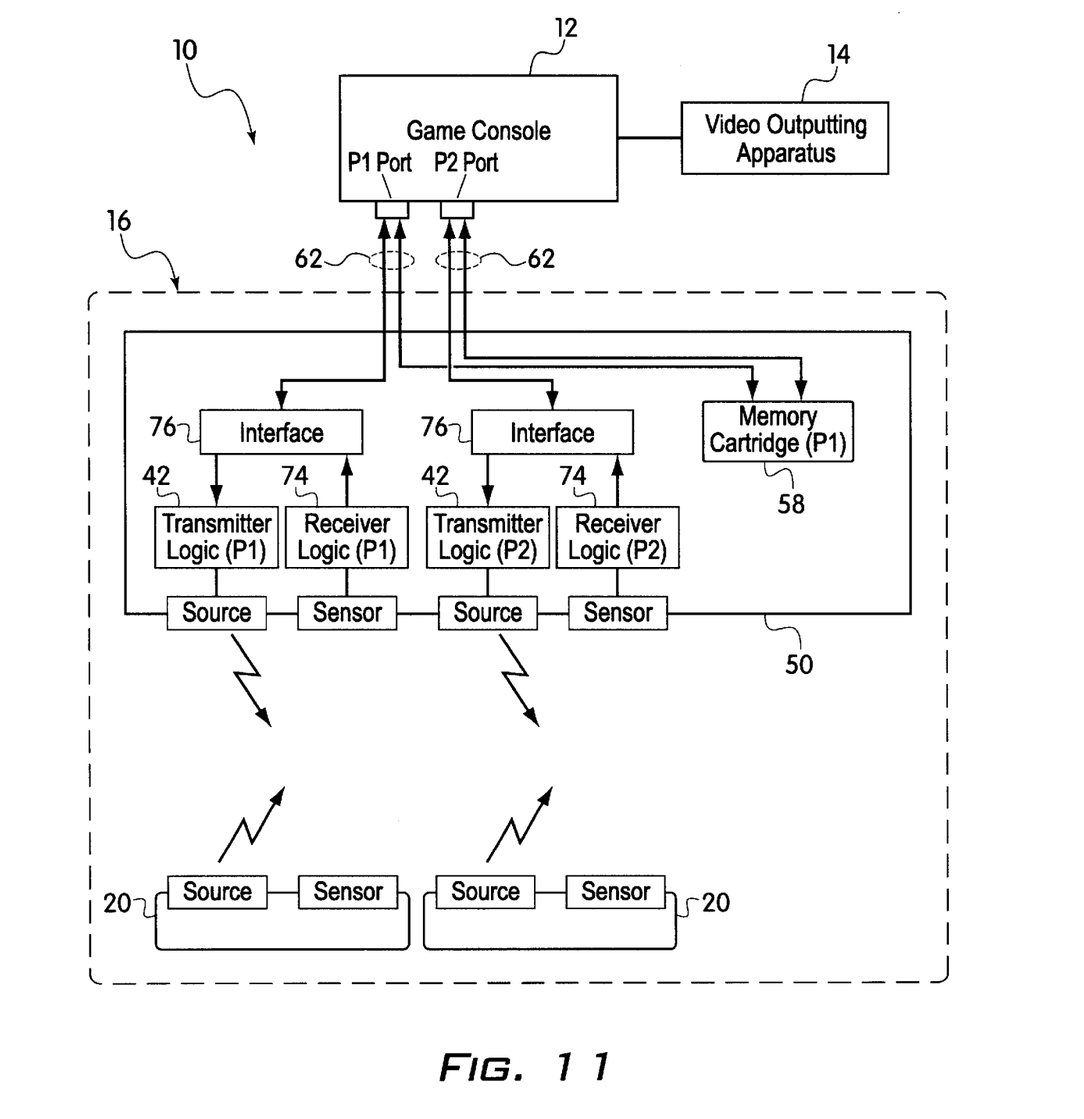
FIG. 11 is a block diagram of another alternative embodiment of the wireless controller unit for bi-directional communication between the controller and the console interface.

Referring now to FIG. 11, an another alternative embodiment of the wireless control unit 16 according to the present invention is shown. In this embodiment, the controller 20 and the console interface 50 are configured for bidirectional wireless communication. For bi-directional wireless communication, the controller 20 and the console interface 50 both would include the transmitter logic 42 (shown in FIG. 5) and the receiver logic 70 (shown in FIG. 8). As discussed above, the transmitter and receiver circuitry for each player playing a game would operate at different frequency bands (or use different coding schemes). Information transmitted from the controller to the interface console includes game information, and information from the console interface to the controller includes information to, for example, reconfigure the functions of the switches and information that provides interaction between the controller and a game being played. The information from the interface console to the controller is collectively defined as controller information. Thus, the controller can include a connection port 86 (seen in FIGS. 2 and 4) for connecting different peripheral devices to the controller which are responsive to the controller information transmitted by the console. Such peripheral devices include memory cartridges, vibrating members (e.g., a rumble pack), and other devices that can respond to controller information transmitted by the console. To illustrate, the vibrating mechanism can be excited at times during play which coincide with certain conditions of the game, such as during a crash. When a crash occurs, the console sends to the controller information to energize the vibrating member so that the entire controller vibrates and the vibrations are felt by the player. A suitable vibrating member is the Rumble Pak™ manufactured by Nintendo.

In addition, FIG. 11 also illustrates using a single memory cartridge for storing 15 the game condition information for each player at one time. However, as noted above multiple memory cartridges may also be used. Further, in this embodiment gun controllers which require bidirectional communication with the game console can be substituted for the controller 20. Such gun controllers would include the transmitter and receiver circuitry discussed above and information transfers would operate in a similar manner as described above.

In the two player embodiments, each controller 20 in the wireless control unit according to the present application can send a auto fire start signal which is included in the bit stream to the corresponding receiver circuitry 70 which decodes the game information from the bit stream. Similar to the above-described embodiments, the console interface logic 76 for each controller monitors the bit stream for the auto activate start signal, and when the auto activate start signal is detected in the stream, the console interface logic automatically inserts an activate signal into the game information to be transmitted to the game console 12 so that one or more objects, such as weapons, in the game being played are continuously activated. The console interface logic 76 for each controller 20 which sends the auto activate start signal continues to insert the activate signal into the corresponding bit stream until the receiver circuitry 70 detects auto activate stop signal for the corresponding controller 20. When auto activate stop signal is detected by the receiver circuitry 70, the receiver circuitry stops inserting the activate signal into the game information sent to the game console 12.

As noted above, by having the controller 20 send a signal to start the auto activate function and the receiver circuitry 70 in the console interface 50 to continuously provide the activate signals to the game console 12, the auto activate function does not prevent the activation of the sleep function in the controllers. That is, the controllers 20 of each wireless control unit according to this embodiment does not continuously send the activate signals when the auto activate function is active and the sleep circuitry in each controller does not continuously detect the auto activate start signal even after a player has stopped playing a game but has inadvertently left the controller power switch on.

It will be understood that various modifications can be made to the embodiments of the present application without departing from the spirit and scope thereof. For example, various types of game consoles executing various types of game programs and interacting with various video outputting apparatus may be used with the wireless control unit. Likewise, various memory cartridges and other peripheral devices may be used with the wireless control unit. Further, the wireless control unit may use other transmission techniques for transferring game information and/or controller information. Therefore, the above description should not be construed as limiting the invention, but merely as disclosing preferred embodiments thereof. Those skilled in the art will envision other modifications within the scope and spirit of the invention as defined by the claims appended hereto.

What is claimed is:

1. A wireless control unit for converting a video game system having a console with game controller ports and being adapted to operate with wired game controllers connected to the game controller ports into a system operable with wireless controllers, the wireless control unit comprising:

a game controller having a plurality of user operable switches for producing a plurality of game information signals including an auto activate signal, wireless transmitter circuitry for encoding the game information signals into a bit stream and for transmitting the encoded bit stream, and a sleep function for powering down said game controller in response to detected inactivity of said plurality of user operable switches for a period of time; and a console interface connected to the game console via at least one of the game controller ports and having wireless receiver circuitry for receiving the encoded bit stream representing the game information, said receiver circuitry having logic circuitry for decoding the bit stream and detecting the auto activate signal in said bit stream and for modifying the game information such that an activate signal is continuously sent from the console interface to the game console via the at least one of the game controller ports, wherein at least one object in a game being played with the video game system console is continuously activated via said console interface in response to the received activate signal, wherein said activate signal being transmitted from said console interface via at least one game controller port operates independent of said sleep function in said game controller.

2. The wireless control unit according to claim 1, wherein the controller has a housing with a control section, left and right side handles extending from the control section and a center handle extending from the control section between the left and right side handles.

3. The wireless control unit according to claim 1, wherein said console interface further comprises a connection port for receiving a memory cartridge for selectively storing game information.

4. The wireless control unit according to claim 1, wherein the controller transmits the game information at a predefined frequency.

5. A wireless control unit for converting a video game system having a game console with game controller ports and being adapted to operate with wired game controllers connected to the game controller ports into a system operable with wireless controllers, the wireless control unit comprising:
- a plurality of game controllers each having at least one user operable switch, wireless transmitter circuitry for transmitting game information, including an auto activate start signal, and a sleep function for powering down said game controller in response to detected inactivity of said at least one user operable switch for a period of time; and
- at least one console interface connected to the game console via at least one of the game controller ports and having wireless receiver circuitry for receiving the game information, including the auto activate start signal, from each of the plurality of game controllers and for selectively modifying the game information from each game controller so that when the auto activate start signal is received by said console interface, an activate signal is continuously sent from the console interface to the game console via at least one of the game controller ports, wherein at least one object in the game being played with the game console is continuously activated via said console interface in response to the received activate signal, wherein said activate signal being transmitted from said console interface via at least one game controller port operates independent of said sleep function in said game controller.

6. The wireless control unit according to claim 5, wherein the at least one console interface comprises a plurality of console interfaces and wherein one console interface corresponds to one of said plurality of controllers, and wherein each console interface includes wireless receiver circuitry for receiving the game information, including the auto activate start signal from the corresponding controller and for selectively modifying the game information so that when the auto activate start signal is received an activate signal is continuously sent from the console interface to the console via the game controller ports, wherein at least one object in a game being played with the game console is controlled by the corresponding controller is continuously activated.

7. The wireless control unit according to claim 5, wherein said console interface further comprises a connection port for receiving a memory cartridge for selectively storing game information.

8. A wireless control unit for converting a video game system having a game console with game controller ports and being adapted to operate with wired game controllers connected to the game controller ports into a system operable with wireless controllers, the wireless controller unit comprising;
- a game controller having at least one user operable switch, wireless transmitter circuitry for transmitting game information, wireless receiver circuitry for receiving controller information, and a vibrating member; and
- a console interface connected to the game console via at least one of the game controller ports and having wireless receiver circuitry for receiving the game information from the game controller, said console interface including wireless transmitter circuitry for wirelessly transmitting controller information to the game controller, said controller information including control signals for activating said vibrating member.

9. The wireless control unit according to claim 8, wherein the console interface further comprises a connection port for receiving a memory cartridge for storing game information.

10. The wireless control unit according to claim 8, wherein the controller further comprises a connection port for receiving a peripheral device.

11. The wireless control unit according to claim 10, wherein the peripheral device comprises a memory cartridge for storing game information.

12. The wireless control unit according to claim 10, wherein the peripheral device comprises said vibrating member.

13. The wireless control unit according to claim 8, wherein the controller further comprises said a sleep function for detecting inactivity of the at least one operation switch and turning off the power to the internal circuitry of the controller in response to a predetermined period of time of detected inactivity, wherein said activate signal being transmitted from said console interface operates independently of said sleep function.

14. A wireless control unit for converting a video game system having a game console with game controller ports and being adapted to operate with wired game controllers connected to the game controller ports into a system operable with wireless controllers, the wireless control unit comprising:
- a game controller having at least one user operable switch, wireless transmitter circuitry for transmitting game information, wireless receiver circuitry for receiving controller information, and a connection port for receiving a vibrating member; and
- a console interface having wireless receiver circuitry for receiving the game information, from at said game controller, said console interface including wireless transmitter circuitry for transmitting controller information including control signals for activating said vibrating member to said game controller.

15. The wireless control unit according to claim 14, wherein said console interface further comprises a connection port for receiving a memory cartridge for storing game information.

16. The wireless control unit according to claim 14, wherein the controller further comprises a sleep function for detecting inactivity of the at least one operation switch and turning off the power to the internal circuitry of the controller in response to a predetermined period of time of detected inactivity, wherein said activate signal being transmitted from said console interface operates independently of said sleep function.

17. The wireless control unit according to claim 8, wherein said game information includes an auto active start signal, said console interface detecting said auto activate signal and modifying the game information so that an activate signal is continuously sent from the console interface to the game console via at least one of the game controller ports, such that at least one object in a game being played with the video game system is continuously activated in response to the received activate signal.

18. The wireless control unit according to claim 14, wherein said game information includes an auto activate start signal, said console interface detecting said auto activate signal and modifying the game information so that an activate signal is continuously sent from the console interface to the game console via at least one of the game controller ports, such that at least one object in a game being played with the video game system is continuously activated in response to the received activate signal.

* * * * *

(12) EX PARTE REEXAMINATION CERTIFICATE (5506th)
United States Patent
Leifer et al.

(10) Number: US 6,280,327 C1
(45) Certificate Issued: Sep. 12, 2006

(54) WIRELESS GAME CONTROL UNITS

(75) Inventors: Alan E. Leifer, Dix Hills, NY (US); Chi-Fu Peng, Chung Li (TW)

(73) Assignee: Freedom Wave LLC, Vernon, CA (US)

Reexamination Request:
No. 90/007,398, Jan. 28, 2005

Reexamination Certificate for:
Patent No.: 6,280,327
Issued: Aug. 28, 2001
Appl. No.: 09/092,489
Filed: Jun. 5, 1998

Related U.S. Application Data

(63) Continuation-in-part of application No. 09/023,813, filed on Feb. 13, 1998, now abandoned.

(51) Int. Cl.
*A63F 13/06* (2006.01)

(52) U.S. Cl. .............. 463/39; 463/36; 345/156
(58) Field of Classification Search ........ None
See application file for complete search history.

(56) References Cited

U.S. PATENT DOCUMENTS

| | | |
|---|---|---|
| 4,531,740 A | 7/1985 | Green et al. |
| 5,691,898 A | 11/1997 | Rosenberg et al. |
| 5,752,880 A | 5/1998 | Gabai et al. |
| 5,767,839 A | 6/1998 | Rosenberg |
| 5,806,849 A | 9/1998 | Rutkowski |
| 5,825,308 A | 10/1998 | Rosenberg |
| 5,828,197 A | 10/1998 | Martin et al. |
| 5,855,484 A | 1/1999 | Hennessey et al. |
| 5,881,366 A | 3/1999 | Bodenmann et al. |
| 5,907,487 A | 5/1999 | Rosenberg et al. |

FOREIGN PATENT DOCUMENTS

| | | |
|---|---|---|
| EP | 0 835 676 | 4/1998 |
| JP | 05-200159 | 8/1993 |
| JP | 05-200160 | 8/1993 |
| JP | 05-200161 | 8/1993 |
| JP | 05-207554 | 8/1993 |
| JP | 06-023149 | 2/1994 |

OTHER PUBLICATIONS

DOCS Distributor Price Sheet Jan. 1, 1996.

*Primary Examiner*—Matthew C. Graham (57) ABSTRACT

A wireless control unit includes a controller having at least one user operable switch and wireless transmitter circuitry for transmitting game information, including a auto activate start information, and a console interface having wireless receiver circuitry for receiving the game information, including the auto activate start information, form the controller and for modifying the game information so that an activate signal is continuously sent from the console interface to the console and at least one object in a game being played with the video game system is continuously activated.

＃ EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 is confirmed.

Claims 8 and 14 are determined to be patentable as amended.

Claims 9–13 and 15–18, dependent on an amended claim, are determined to be patentable.

8. A wireless control unit for converting a video game system having a game console with game controller ports and being adapted to operate with wired game controllers connected to the game controller ports into a system operable with wireless controllers, the wireless controller unit comprising;
   a game controller having at least one user operable switch, wireless transmitter circuitry for transmitting game information, wireless receiver circuitry for receiving controller information, and a vibrating member; and
   a console interface connected to the game console via at least one of the game controller ports [and] *for converting the wired game controller video game system into a system operable with wireless controllers, said console interface* having wireless receiver circuitry for receiving the game information from the game controller[, said console interface including] *and* wireless transmitter circuitry for wirelessly transmitting controller information to the game controller, said controller information including control signals for activating said vibrating member.

14. A wireless control unit for converting a video game system having a game console with game controller ports and being adapted to operate with wired game controllers connected to the game controller ports into a system operable with wireless controllers, the wireless control unit comprising:
   a game controller having at least one user operable switch, wireless transmitter circuitry for transmitting game information, wireless receiver circuitry for receiving controller information, and a connection port for receiving a vibrating member; and
   a console interface *for converting the wired game controller video game system into a system operable with wireless controllers, said console interface* having wireless receiver circuitry for receiving the game information[.] from [at] said game controller[, said console interface including] *and* wireless transmitter circuitry for transmitting controller information including control signals for activating said vibrating member to said game controller.

\* \* \* \* \*